April 23, 1957 S. FAIZI 2,789,822
TARGET WITH ELECTRICAL INDICATOR
Filed Feb. 7, 1955 6 Sheets-Sheet 1
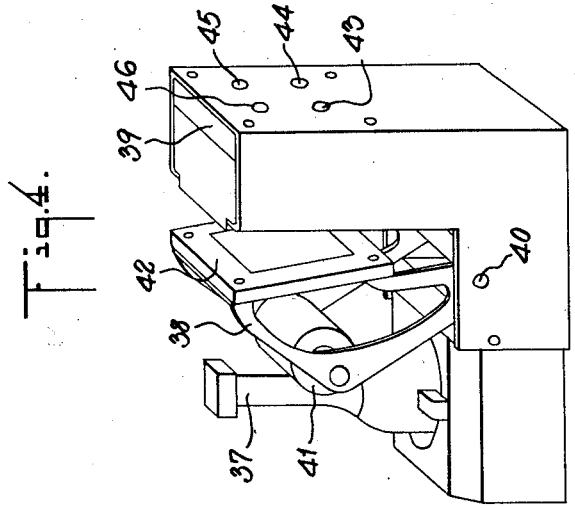
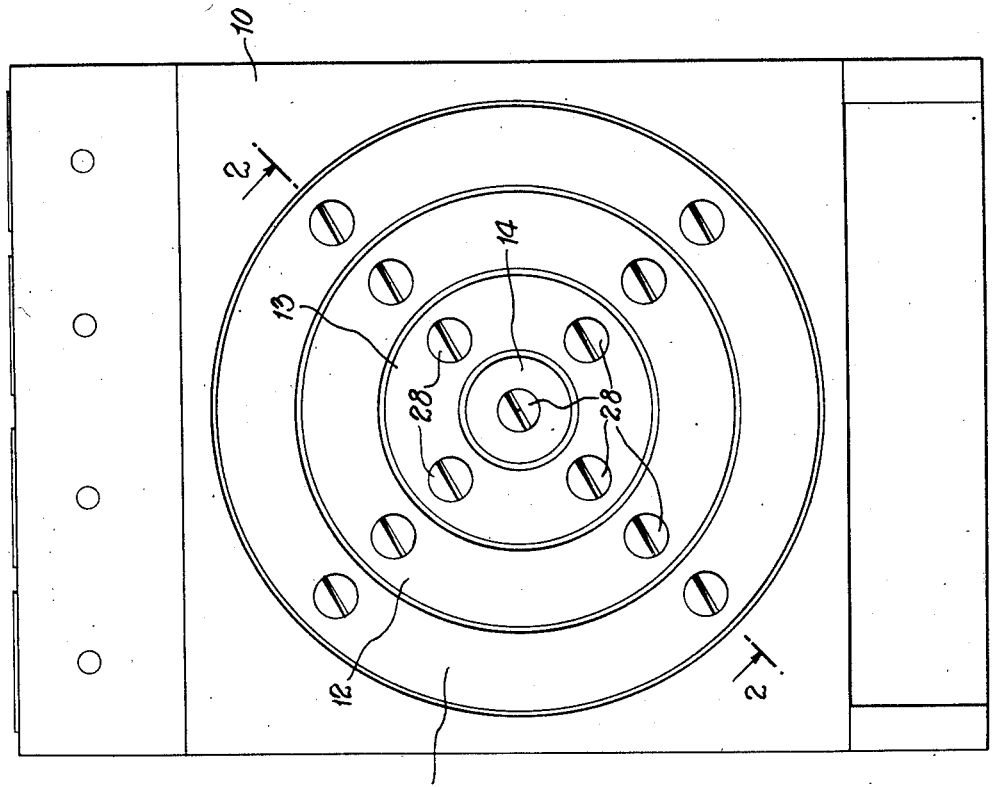
INVENTOR.
Salich Faizi
BY
Benj. T. Rauber
ATTORNEY

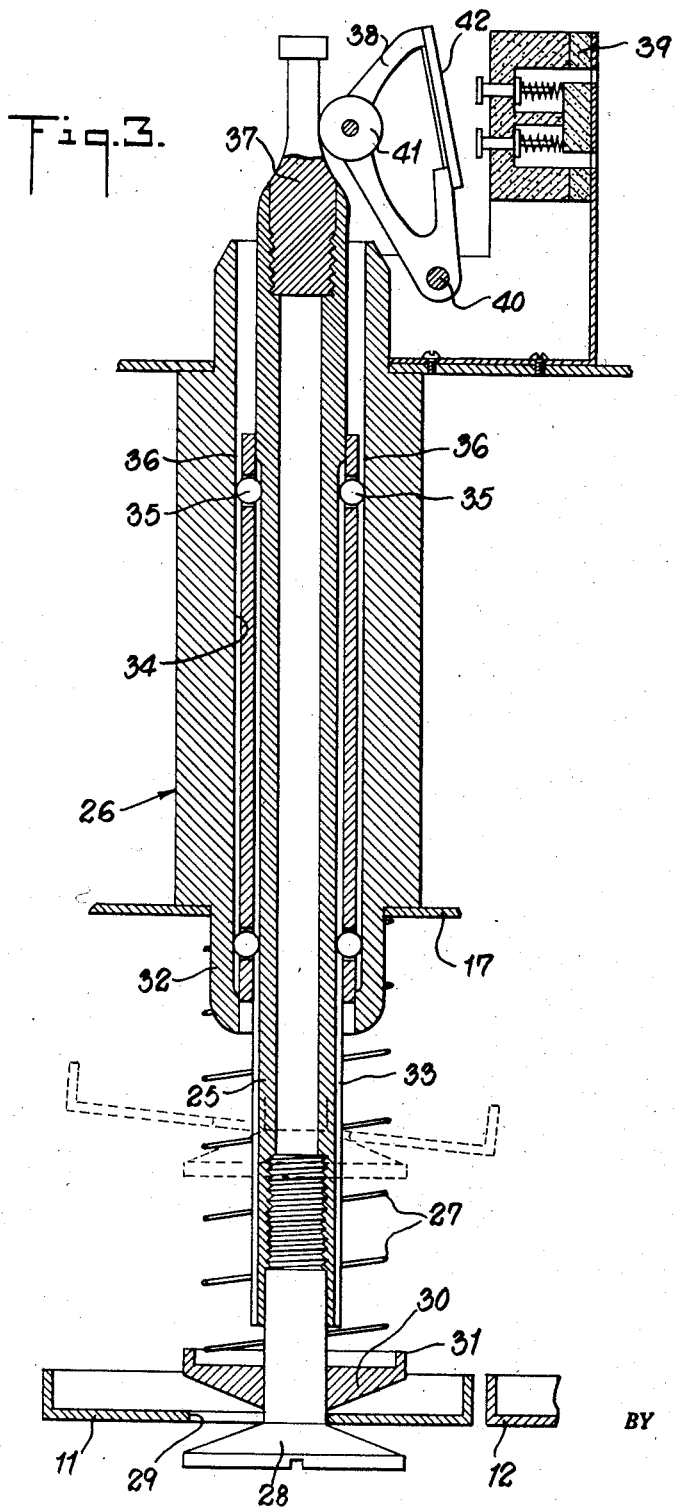

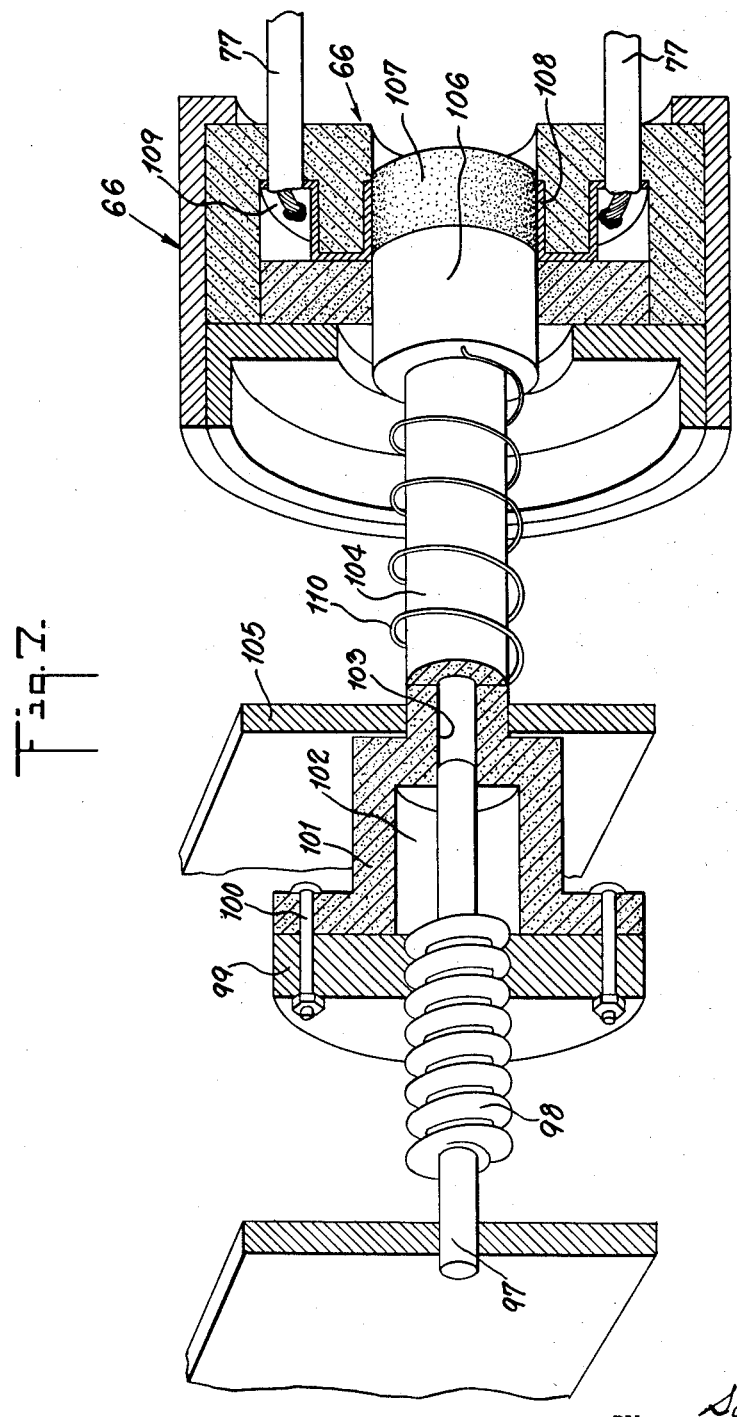

United States Patent Office 2,789,822
Patented Apr. 23, 1957

2,789,822

TARGET WITH ELECTRICAL INDICATOR

Salih Faizi, New York, N. Y.

Application February 7, 1955, Serial No. 486,597

8 Claims. (Cl. 273—102.2)

My present invention relates to apparatus to measure and record the force and accuracy with which an object is thrown toward a target. The object may be a soft ball, baseball or any other type of ball, or it may be an arrow, such as is used in archery, or other projectile used in sports.

The apparatus of my invention provides a means whereby in practice or in a competitive game the accuracy and force with which a ball or other object is thrown toward the target, may be measured for each individual throw or toss, and in which also the total or score of the force and accuracy may be determined and recorded.

In the apparatus of my invention I provide a target comprising a number of concentric discs all of which except the center one are annular. And I also provide that when a ball or other object is thrown to this target the particular ring struck by the object will be indicated by a visual signal, such as a light, and in which the value of each ring is indicated by the light. The greatest value being given to the center or bull's-eye, with decreasing values for the other rings.

Each of the rings is spring pressed to a normal position in which all of the rings are in a common plane. When one ring is struck by a ball or other object it is pushed back against the resistance of the spring a distance proportional to the force of the ball at the time it strikes the ring. Each ring is provided with a spring pressed cam operated electric switch, such that the cam is displaced the greater the distance the harder the blow and, therefore, requires a longer time to return thus holding the lighting circuit for that ring active for a corresponding period of time. Also the electric circuit for each ring acts to start an electrically controlled clock of stopwatch type to start whenever any ring is displaced by the ball and to be stopped when the ring returns to its original position so that each throw or toss causes the clock to rotate for a period of time depending upon the force of the blow to the ring. These periods of activity of the clock are cumulative thus giving the cumulative or average force with which the ball or other object is thrown.

Each of the lights actuated by the respective rings is in series with a watt hour meter and as the lamps are of different watt rating this watt hour meter will measure the value of the particular ring struck and as these measurements are successive the watt hour meter will measure the sum total of these separate and successive values.

Means are also provided to maintain accurately the amount of electricity invariable for the lamps and watt hour meter, i. e., to prevent any increase or decrease of the amount of electricity passing through the given lamp due to the possible variation of voltage in the circuit. This constant is imposed on the watt hour meter by the operation of a time limit interrupter that breaks the circuit after passing a constant amount of electricity no matter what voltage changes may occur in the circuit.

When the target is struck by a ball it may happen that the ball hits the target approximately on or close to the marginal edge of a ring so that it hits not only that ring but an adjacent or adjoining ring. This would cause an interference in the electric circuits. To avoid this I have provided an interlocking arrangement in the electric circuits which prevents actuation of a circuit by more than one ring at a time.

The various features of my invention are illustrated, by way of example, in the accompanying drawings in which—

Fig. 1 is a front elevation of the apparatus looking toward the target;

Fig. 3 is a longitudinal section of a plunger contact which is actuated on striking and displacing a ring;

Fig. 4 is a view of that end of the plunger contact showing the arrangement of switches;

Fig. 7 is a detail on a somewhat larger scale of certain parts of the time limit device of Fig. 6.

Figure 2:
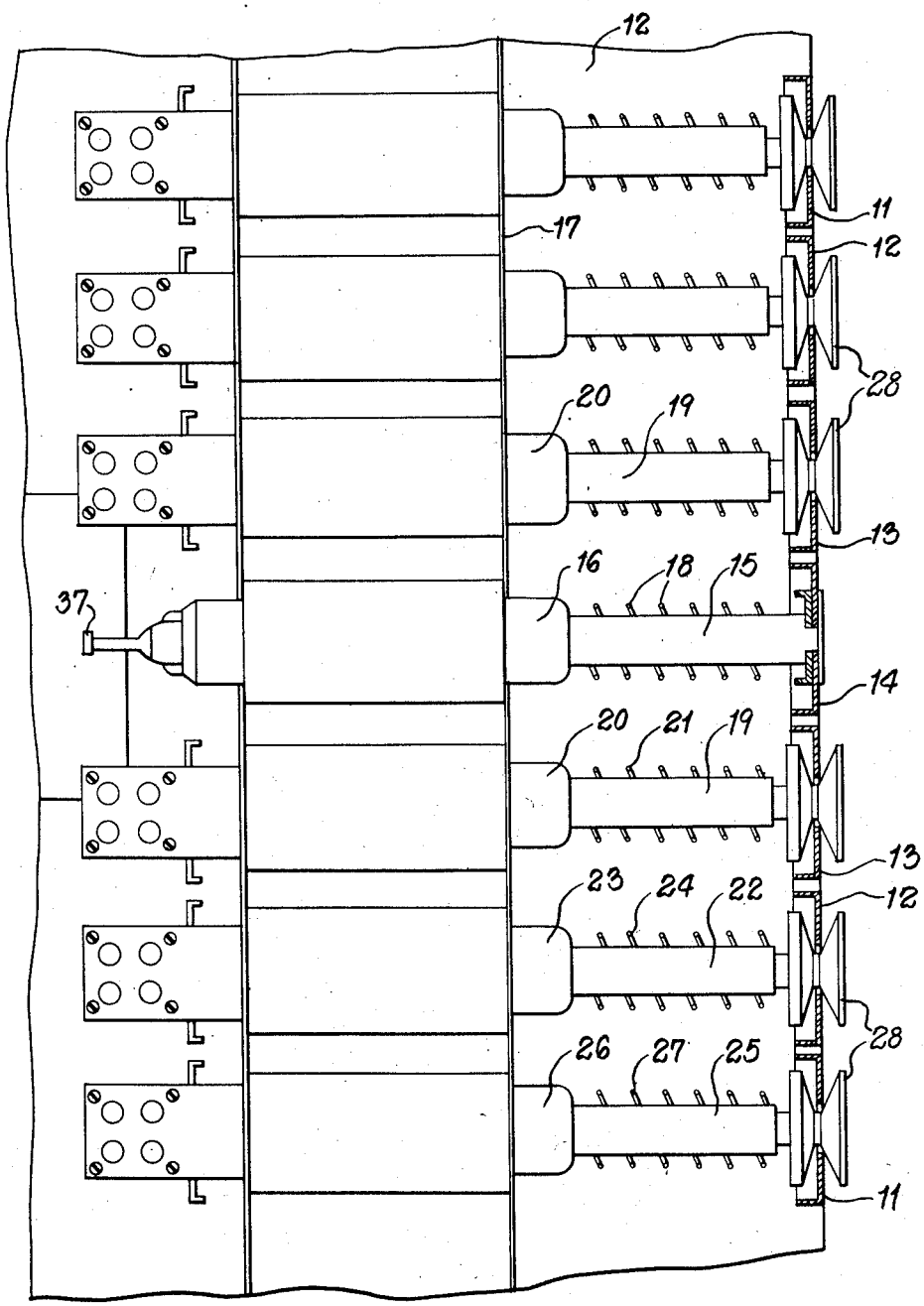
Fig. 2 is a section taken on the line 2—2 of Fig. 1.

Referring more particularly to Figs. 1 and 2 of the accompanying drawings, the apparatus of my invention comprises a supporting cabinet 10 which may be of any suitable construction, in the front face of which is mounted a target comprising a number of concentric annular plates 11, 12, 13 and 14 of which the central plate 14 is the bull's-eye.

In the embodiment illustrated there are four plates, but any number of plates may be used. As shown more particularly in Figs. 2, 3 and 4, the central plate or bull's-eye is supported by the piston or stem 15 of a plunger switch 16 which is mounted in a framework 17 in the cabinet 10.

The stem of plunger 15 is slidable in the housing of the switch 16 so that when the bull's-eye or plate 14 is hit by a pitched ball or other projectile it presses the stem 15 backwardly against a spring 18. The distance to which the plate 14 is moved against the pressure of the spring 18 is proportional or approximately proportional to the force of the ball or projectile hitting the plate. The annular plate 13 is similarly supported by four plungers 19 spaced at 90° intervals about the circumference of the plate or disc.

The plungers 19 are slidably mounted in the housings of individual switches 20 and are spring pressed by springs 21 to hold the plate 13 in a common plane with the plates 11, 12 and 14 except when the plate 13 is hit by a ball or other projectile. Similarly the plate 12 is supported by four plungers 22 of four switches 23 respectively, and is pressed forwardly by springs 24. The plate 11 is similarly held in position by four slidable plungers 25 in the respective switch housings 26 and are pressed forwardly by springs 27.

The construction of the various plungers and switches is shown by way of example in Figs. 3 and 4. As shown in these figures the plunger 25, for example, is provided with a screw 28 threaded into the end of the plunger in position to bear against a part of the periphery of an opening 29 in the plate 11. The side of the screw 28 bearing against the periphery of the opening 29 is conical in shape. On the opposite side of the plate 11 about each of the screws 28 is slidably mounted a washer 30 the face of which bearing against the plate 11 is also of conical shape. The washer 30 has a lip or annular flange 31 facing away from the plate 11 to form a retaining wall for the spring 27, the other end of the spring bearing against the supporting structure 17 and encircling a part 32 of the switch housing extending through an opening in the structure 17.

It will thus be apparent that the plate 11 may move backwardly from the position shown in full lines in Fig. 3 to that shown in dotted lines turning about a similar piston and retaining washer at the diametrically opposite side of the ring or annular plate.

The opening 29 is somewhat larger than the stem of the screw 28 to permit the plate 11 to swing inwardly as the plate swings to the broken line position.

It will be noted that the plate 12 is adjacent the plate 11 and will be similarly mounted on its respective plungers 22 and that the plate 13 may also be similarly mounted. The central plate or bull's-eye 14 may be rigidly mounted on its plunger 15 as there is no necessity for it to tilt as it is struck by the ball or projectile.

Each of the plunger driven switches 16, 20, 23 and 26 are of identical construction and the description of switch 26 will suffice for all the others. In this switch the plunger 25 is slidably mounted in a bore extending longitudinally through the switch casing 26 and has a number of grooves 33 spaced uniformly about the circumference of the plunger. The bore of the switch casing 26 has a similar number of complementarily placed longitudinal grooves 34. These grooves 33, 34, are positioned opposite each other and serve as the raceways for ball bearings 35 which are kept at properly spaced distances by a slidable carriage 36. The grooves 33 terminate short of the inner end of the plunger 25 and the grooves 34 terminate short of the opposite end of the bore of the casing 26 to prevent the ball bearings 35 rolling out of the bore.

At the end of the plunger 25 opposite the screw 28 there is provided a cam 37 to open and close a switch. The cam 37 is of a tapering cylindrical or conical shape. The closing bridge 38 of a switch 39 is pivoted at its lower end 40 and may be normally spring pressed, by a spring not shown, or acted upon by gravity to bring a cam roller 41 against the surface of the cam 37.

When the plate 11, or other plates of the target, is pressed inwardly pushing the plunger 25 against the action of the spring 27 the roller 41 rides on the surface of the cam 37 from a narrower diameter to a larger diameter thus moving the bridge element 38 of the switch clockwise to bring a conductive plate 42 into contact with each of four terminals 43, 44, 45 and 46. Of these terminals, terminal 43 is a lead-in terminal and is thereby connected to each of the terminals 44, 45 and 46 thus supplying current to each of these terminals and to their respective circuits. It will be understood that the conductive plate 42 will be insulated from the other parts of the bridge member 38 to avoid grounding of any of the terminals and their circuits.

Figure 5:
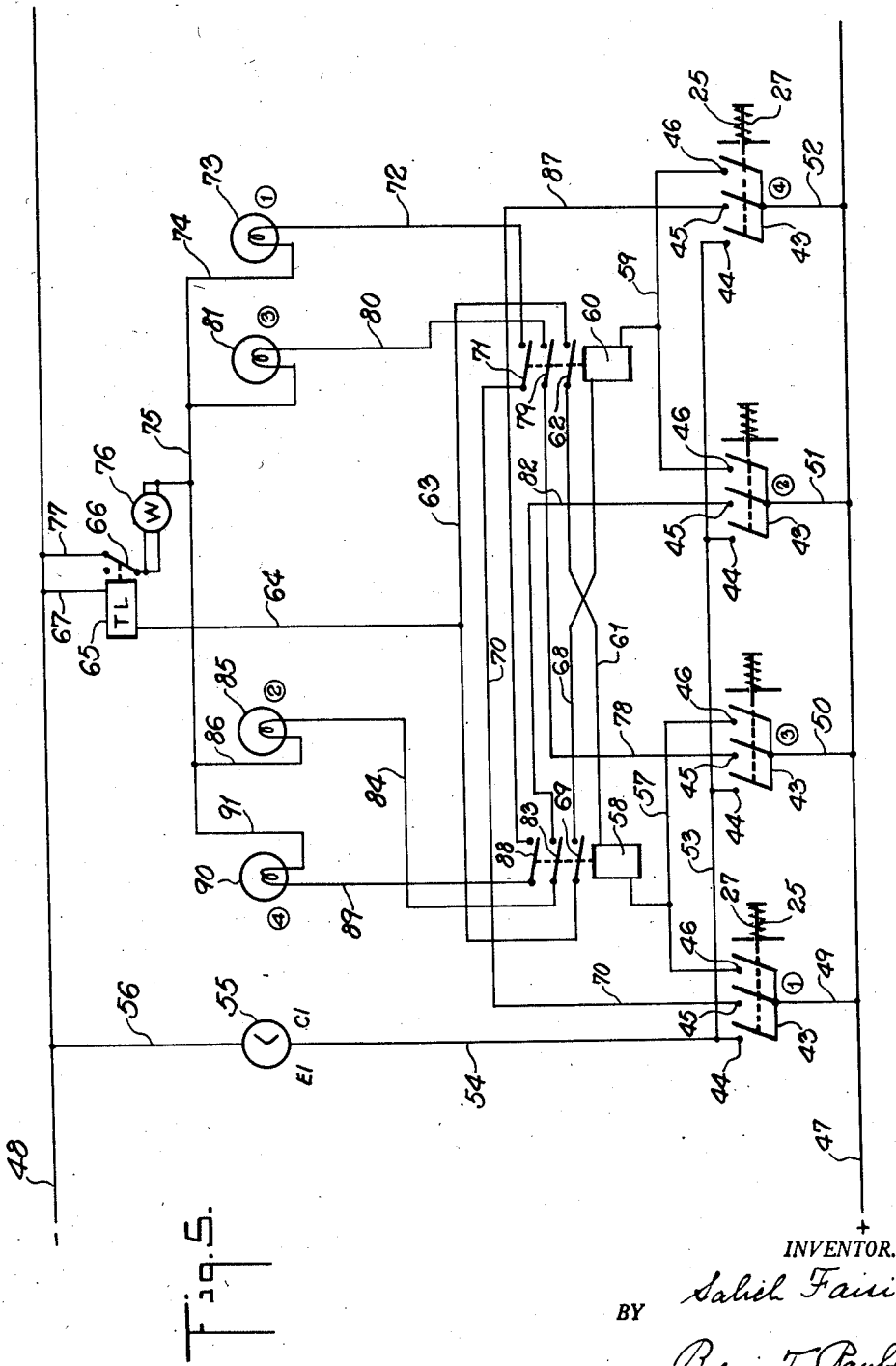
Fig. 5 is a wiring diagram of the electric circuits used in my invention.

The switch 39 and the terminals 43—46 inclusive control the electric circuitry in the diagram shown in Fig. 5. In this diagram the wiring includes only the set of switches in one radius of the plates 11 to 14 inclusive inasmuch as the other three radii of switches would be merely duplicates with the wiring leads in substantially the same position as shown in Fig. 5. As this would unnecessarily complicate the wiring diagram only the four switches in one radius of the target are shown.

In the target itself the switches would be arranged in the positions 1, 2, 3 and 4 extending inwardly from the outermost ring to the center or bull's-eye. For simplicity in the wiring diagram switches in positions 2 and 3 have been interchanged as the switches in positions 1 and 3 are connected in one pair while the switches in positions 2 and 4 are arranged in a second pair, for reasons which will appear hereinafter.

In the wiring diagram the current is supplied through one supply line 47 at one side of the diagram and withdrawn from another terminal 48 shown at the opposite side. The current may be supplied from a battery or from a power line or any other suitable source and may be either direct current or alternating current.

As shown in the wiring diagram terminals corresponding to the terminal 43, Fig. 4, are supplied from line 47 from branch leads 49, 50, 51 and 52. The terminal 43 is shown as making contact with the contacts 44, 45, 46 when the plunger 25 is pressed inwardly against the action of the spring 27. When the plunger is thus pressed in, bringing the contact 43 into contact with the terminal 44 of its respective plunger and switch, the main 47 is connected through the branch leads 49, 50, 51 or 52 respectively and the terminal 44 to a connecting lead 53 which in turn is connected to a lead 54 to an electric clock 55 and thence through a return lead 56 to the return main 48.

It will be apparent, therefore, that when any one of the switches in positions 1, 2, 3 or 4 is closed it will start the electric clock 55 which will then run until the switch is again opened. As the time during which the switch is closed depends upon the distance to which the plunger has been forced in by the force of the pitched ball or projectile, and as the time in which contact is made is proportional to the time that is required to return the plunger to its original position, the time of running of the electric clock will be proportional approximately to the force of the pitched ball or projectile, striking any one of the different plates 11—14. The force of any ball regardless of which plate is struck will thus be registered by the electric clock and the sum of all pitched balls may also be registered by the total time for an entire series of throws.

The electric clock may be of a stop-watch variety, the stopping and starting stem or control of which may be operated electromagnetically by the circuit 54—56. The clock mechanism need be only sufficient for a few seconds operation at each interval. As the specific construction of the electric clock or stop-watch may be of any construction well known in the art and is not itself a specifically novel feature of my invention, it is not illustrated in detail.

When any plate 11—14 is hit and depressed the switch terminal 43 also makes contact with the terminal 46 closing a circuit from the supply main 47 through the respective branch leads 49—52 to the respective terminals 46.

The terminals of the switches in positions 1–3 are connected to a lead 57 leading through an electromagnet 58 while the terminals 46 of the switches in positions 2–4 are similarly connected to a lead 59 leading to an electromagnet 60.

Current passing to the electromagnet 58 is conducted through a lead 61 to a normally closed switch 62, thence through a lead 63 and 64 to the time limit interrupter 65 of a switch 66 and thence through a lead 67 through the return main 48. Similarly when the current is closed through the terminals 46 of the switches in either position 2 or 4, current flows through the main 59, solenoid 60, lead 68 to a normally closed switch 69 controlled by the solenoid 58 and thence through lead 63, lead 64, solenoid 65 and lead 67 to the return main 38.

It may be noted that as soon as current flows through the solenoid 58 the normally closed switch 69 is opened thus breaking the circuit through the solenoid 60 and, conversely, when the solenoid 60 is energized it opens switch 62 and breaks the circuit through the solenoid 58. It is thus apparent that if a ball should strike any one of the plates near its marginal edge so that it would immediately strike an adjacent plate current will first flow through the solenoid of the first plate, as for example the plate in position 3, and will immediately break the circuit through the two adjacent plates of position 2 and 4, so that when the ball or other projectile strikes them no current can flow through their respective solenoid 60. This ensures that when a ball strikes on one plate near its peripheral margin and then as this plate is depressed touches and depresses the second plate, only the circuit corresponding to the first plate will become active. This prevents a single throw from activating the circuits of two or more plates.

When the terminal 45 of No. 1 position corresponding to plate 11 is closed current flows from the main 47 through a branch lead 49 through a lead 70 to a switch 71 which is normally closed unless the solenoid 60 is energized. As the solenoid 60 would not be energized unless either of the plates 2 or 4 had been first struck and depressed, the current will continue to flow from the switch 71 through a lead 72 and lamp 73 corresponding to the No. 1 position. From the lamp 73 the current will flow through a return lead 74 and a collecting lead 75 to a watt hour meter 76. The current will continue to flow through the watt hour meter and thence through the time limit switch 66 to a return lead 77 to the return main 48. Thus when the plate corresponding to No. 1 position, namely any of the switches connected to plate 11, is struck, and no other plate is struck earlier, the lamp 73 corresponding to plate 11 will be lighted until the time limit interrupter 65, calibrated for a standard amount of electricity, opens switch 66 and breaks the current after passing a given amount of electricity. The lamp will be one of low power as, for example, one watt, and accordingly, the watt meter will register an amount of energy corresponding to the power of one watt for the time the circuit is energized.

Similarly if a switch in No. 3 position corresponding to plate 13 is closed the terminal 45 of this switch will connect to the supply main 47, lead 78 leading to a switch 79 also controlled by the solenoid 60, then through a return lead 80 to a lamp 81 corresponding to plate 13 and thence to the main 75, watt meter 76, switch 66 and return lead 77 to the return main 48. In this case the lamp 81 will be lighted and will be of higher power than lamp 73 as, for example, three watts, and the watt hour meter will record correspondingly a reading on the scale three times higher for any particular hit than if the plate 11 were struck.

If the switch in No. 2 position is closed current will flow through the lead 51, contact 45, to a lead 82, thence to normally closed switch 83 controlled by the electromagnet 58, thence through a return lead 84 to a lamp 85, thence through a return lead 86 to collecting lead 75, thence to the watt meter 76, switch 66 and lead 77 to the return main 48. In this case also the lamp 85 will be lighted and will be, for example, a two watt lamp. The scale of the watt hour meter will show, therefore, a two times higher reading for the plate 12 than for the plate 11.

If the bull's-eye 14 which corresponds to position Number 4 is depressed the switch 43 will close through a corresponding terminal 45 in the No. 4 position, connecting the main 47 through the lead 52 and a lead 87 to a switch 88 also controlled by the solenoid 58 but normally closed, and thence through a lead 89 to a lamp 90 corresponding to the No. 4 position or bull's-eye.

From the lamp 90 the current will return through return leads 91 and 75, watt hour meter 76, switch 66 and lead 77 to the return main 48. The lamp 90 which thus corresponds to the bull's-eye will be of much higher power as, for example, 25 watts and will record a proportionately higher energy on the watt hour meter 76 for a given period of time.

It will be understood that the watt hour meter will give a total score corresponding only to the accuracy of the hit but not to its force for all of the pitches. The time limit circuit breaker 65, calibrated for a given period of time and, therefore, opening switch 66 after passing of a constant amount of electricity through the leads 64 and 67, eliminates any influence of time depending upon the force of the hit on the score of the watt hour meter. The apparatus may be set for any given number of pitches as, for example, up to forty, the electric clock 55 will total the score for power or speed while the watt hour meter will be calibrated to give a score of accuracy.

Figure 6:
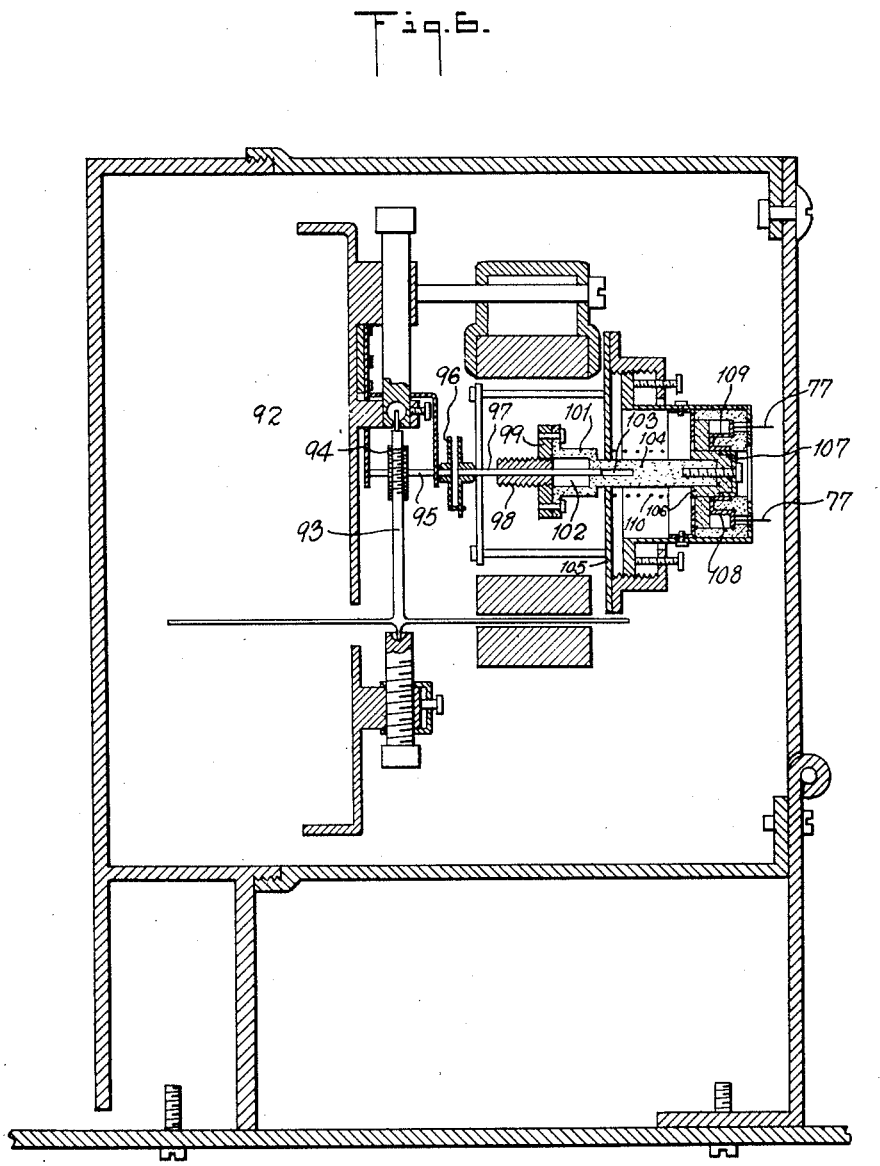
Fig. 6 is a longitudinal vertical section of the time limit device.

The time limit circuit breaker 65 prevents the point recording indicator driven by the watt hour meter 76 from measuring more than the necessary electric current or energy for the ring hit. An embodiment of this element is shown in Figs. 6 and 7 in which is provided an electrically driven motor, not shown, placed in the space 92, similar in principle to a watt meter but designed to run at a greater speed. It may be supplied with a greater amount of energy than passes to the watt hour meter. The motor 92 drives a worm shaft 93, the worm of which meshes with a gear 94, behind the shaft 93, on a shaft 95. This shaft is coupled by means of a coupling 96 to a shaft 97 having a screw threaded portion 98. This shaft and the screw threaded part are free to rotate when driven through the clutch 96 but are kept from longitudinal movement. The threaded portion 98 is threaded into a tap opening in a nut 99 which in turn is secured by bolts or rivets 100 to a block of insulating material 101. This block of material has a longitudinal recess 102 to receive the screw threaded portion 98 of the shaft 97 and a smaller recess 103 to receive a part of the shaft 97 projecting beyond the screw threaded portion 98.

The insulating block 101 has a cylindrical extension 104 through a supporting wall 105. On the end of the extension 104 is mounted a piston-like head 106 having a conductive band or collar 107 which in the position shown in Fig. 7 bridges a pair of insulated contacts 108 and 109 which constitute the switch 66 and serve to close the circuit through the lead 77, the wires of which are connected to terminals 108 and 109.

When the motor 92 is energized it drives the shaft 97 in a direction to thread the nut 99 toward the partition 105 against the action of a spring 110 confined between the head 106 and the partition 105 and thus move the bridging contact 107 from position between the contacts 108 and 109 to break the circuit 77.

The spring 110 is secured at one end to the head 106 and the other has a frictional contact with the partition 105 so that when the shaft 97 is rotated friction at the contact between the spring 110 and the supporting wall 105 avoids rotation of the head 106, extension 104 and insulating block 101 and of the nut 99 solidly connected with it. Therefore, the screw threaded portion 98 moves into the threaded opening of the nut 99 and pulls extension 104 of the insulating block 101 through the opening of the partition 105. After a certain number of rotations of the shaft 97, that is, after the passing of a given amount of electricity through the motor 92, the head 106 is pulled so far to the left that its conductive band 107 gets out of position bridging terminals 108 and 109; then the circuit through the switch 66 is broken and watt meter 76 disengaged. Meanwhile the end of the shaft 97 projecting beyond the screw threaded portion 98 reaches the bottom of the recess 103 in the insulating block 101 and prevents further driving of the screw threaded portion 98 into the nut 99. Thereafter the nut and block 101 along with its extension 104 and head 106 starts rotating together with the shaft 97. The spring 110 first winds itself and further takes up in a sliding action at the end touching the supporting wall 105. This rotation continues until the circuit through the motor 92 is broken by the opening of the switch 43. As soon as this occurs further rotation of the shaft 97 ceases and the spring 110 unwinds rotating the head 106 and moving it back into its normal position with its conductive band 107 bridging the terminals 108 and 109 of the switch 66. Then the apparatus is automatically prepared for the next hit by a ball.

The manner of action of the apparatus is as follows:

When any one of the annular plates 11, 12, 13, 14, is struck by a ball or other projectile, it drives the plunger switches 15, 19, 22 or 25 inwardly to close the switch 43 of its respective station. This immediately closes a circuit through the contact 44 and through the leads 53 and 54 through the electric clock 55. The clock remains running until the spring 27 shall have returned the switch 43 to open position whereupon the clock will stop. The lapsed time indicates the force of the blow or the speed of the ball or projectile. At the same time contact is made with the terminal 46 through the solenoid 58 or 60, depending upon which ring is depressed. One of the switches 62 or 69 controlled by the respective solenoid 60 or 58 is closed and current continues through the other of these switches through the leads 63, 64, time limit switch 65 and lead 67 to the return main 48. Thus if one ring should be struck and the ball should thereafter come in contact and depress the adjacent ring or plate the circuit would be closed for the first plate struck and not the second.

Upon the closing of switch 43 a circuit is also established through the terminal 45 and any one of the respective switches 71, 79, 83, 82 to one of the respective lamps 73, 81, 85, 90, and thence through lead 75 and watt meter 77 to the return main 48 so long as the time limit switch 66 remains closed. The lamps 73, 81, 85 and 90 are of different wattage and since the watt meter 76 is disengaged by the time limit switch 66 after a constant period of time, the point recording indicator driven by the watt-meter 76 records the accuracy of hits only according to value of the ring struck, that is, to wattage of the lamp that is lighted at that time and is entirely independent of the force with which the ring is struck.

The lamps will, of course, be arranged in proper sequence and not in the position shown in Fig. 5, the position of the lamps being indicated in Fig. 1.

Having described my invention, what I claim is:

1. Apparatus for measuring the speed and accuracy of a thrown ball which comprises a target of several concentric plates, means for supporting said plates individually comprising supporting guides and supporting rods slidable axially in said guides and extending rearwardly from said plates to permit said plates to move rearwardly under the impact of a thrown ball, said rods being of reduced diameter at their rear ends, electric switches one for each rod and each having a follower bearing against said rod to close said switch when the rod is moved rearwardly to bring the follower from the part of reduced diameter to the part of larger diameter, a spring for each rod resiliently pressing the rod forwardly to bring said plates to a common plane and being compressed to permit said rod and its plate to move rearwardly a distance proportionate to the energy of impact of a thrown ball, a number of circuits controlled by each said switch comprising a first circuit common to all switches, a clock in said first circuit started by the closing of any of said switches and stopped by the opening thereof, a number of second circuits in parallel each opened and closed individually by a switch of one plate and each comprising a lamp, the lamps being of current capacity increasing from the outer plate to the inner plate, a third circuit in series with said second circuits and comprising a watt hour meter and a time limit switch controlling said third circuit to provide a fixed time period for said watt hour meter.

2. The apparatus of claim 1 in which said time limit switch comprises a motor driven by the third circuit, a switch support, a pair of terminals, a bridging contact movable to and from said terminals, a screw and nut transmission between said motor and said bridging contact to draw said bridging contact out of engagement with said terminals, a coil spring positioned between said bridging contact and said support co-axially with the axis of rotation of said transmission and frictionally held against rotation between said contact and said support to hold said contact from rotation until after it breaks contact with said terminals and stops and then permitting rotation of said contact while undergoing torsional winding and then unthreading said nut and screw transmission upon unwinding to return said bridging contact to engagement with said terminals.

3. The apparatus of claim 1 comprising a pair of fourth circuits each controlled by the switches of alternate plates, each of said fourth circuits comprising an electromagnetic switch actuated when energized to open the other circuit.

4. The apparatus of claim 3 having a circuit in series with said fourth circuits and including said time limit switch.

5. Apparatus for measuring the speed and accuracy of a thrown ball which comprises a target of several concentric plates, means for supporting said plates to permit said plates to move backwardly individually under the impact of a thrown ball, at least one cam movable by each plate, electric switches one for each cam each having a follower movable by its cam to close when its plate is moved backwardly, at least one spring for each plate pressing said plate resiliently forwardly to a plane common to all plates and being compressed to permit said plate to move rearwardly a distance proportionate to the energy of impact of a thrown ball, a number of circuits controlled by each of said switches, said circuits comprising a first circuit common to all switches, a clock in said first circuit started by the closing of said circuit and stopped by the opening of said circuit, a number of second circuits in parallel each opened and closed individually by a switch of one of said several plates and each comprising an electric lamp, the lamps of said circuits being of a current capacity increasing over that of the circuit controlled by the adjacent outer plate, a third circuit in series with said second circuits and comprising a watt hour meter and a time limit switch controlling said third circuit to provide a fixed time period for said watt hour meter.

6. The apparatus of claim 5 in which said cams each comprises a plunger having a tapered cam surface.

7. The apparatus of claim 5 comprising a pair of fourth circuits each controlled by the switches of alternate plates, each said fourth circuit comprising an electromagnetic switch actuated when energized to open the other circuit.

8. The apparatus of claim 5 in which each said plate is supported by individual yielding supports at angularly spaced distances to permit said plates to tilt rearwardly.

References Cited in the file of this patent

UNITED STATES PATENTS

| | | |
|---|---|---|
| 1,371,820 | Sochurek | Mar. 15, 1921 |
| 1,852,948 | Warren | Apr. 5, 1932 |
| 1,969,139 | Knapp | Aug. 7, 1934 |
| 2,102,166 | Roberts | Dec. 14, 1937 |
| 2,487,871 | Havey | Nov. 15, 1949 |
| 2,592,429 | Kimmel | Apr. 8, 1952 |